United States Patent Office 3,297,932
Patented Jan. 10, 1967

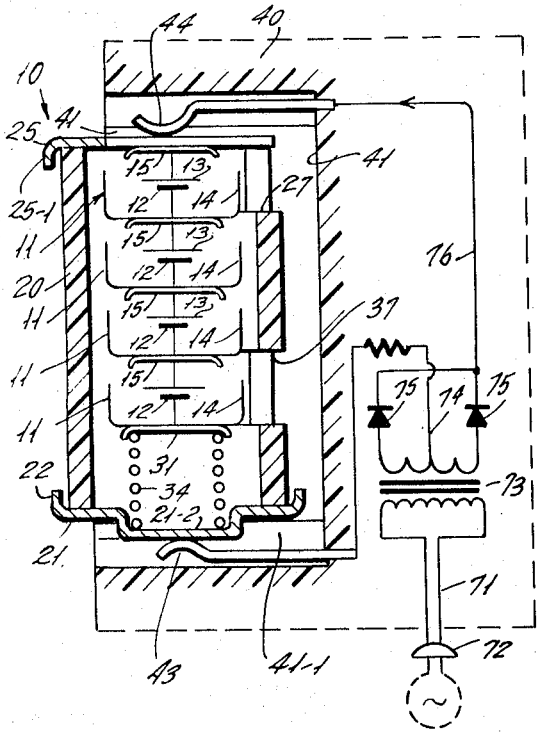

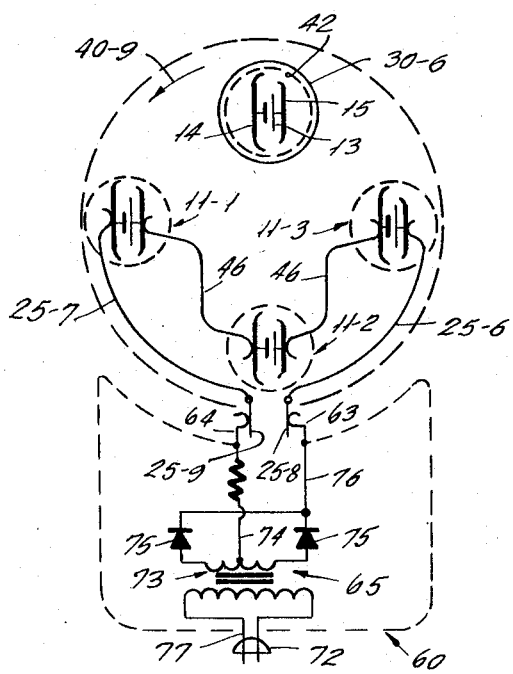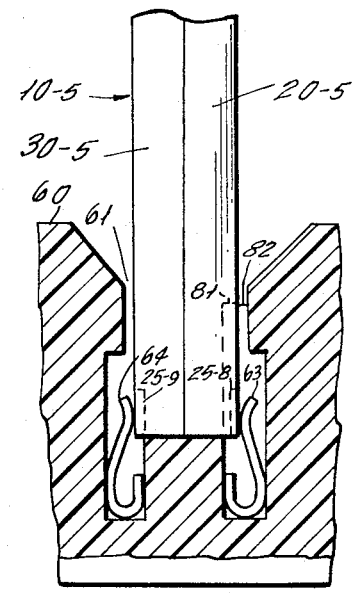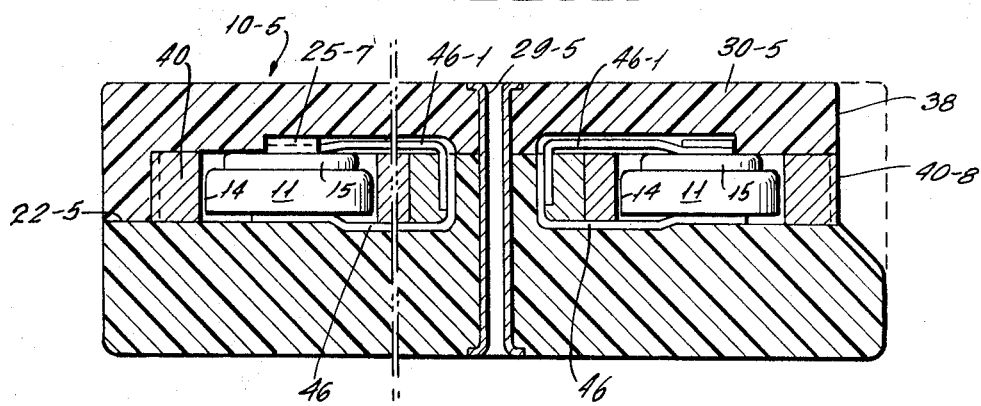

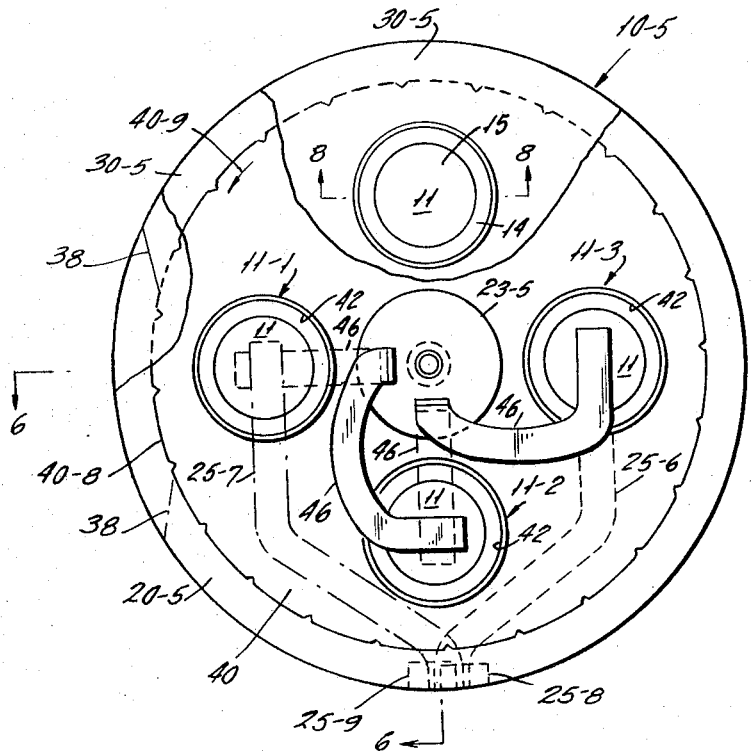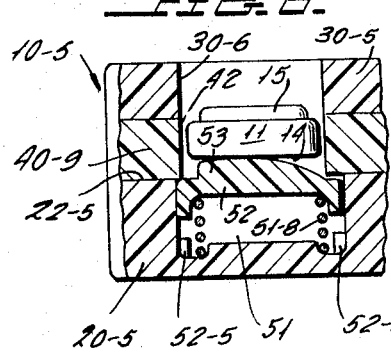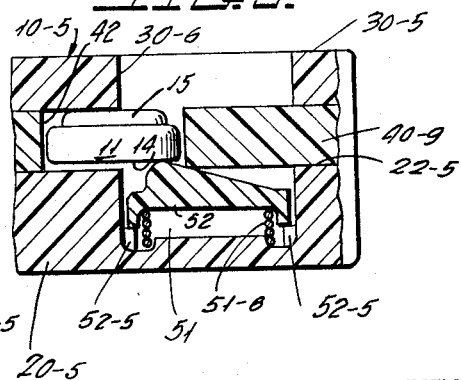

3,297,932
BATTERY DISPENSER-CHARGER DEVICES
Eugene F. Murphy, Yorktown Heights, N.Y., assignor to Sonotone Corporation, Elmsford, N.Y.
Filed Dec. 30, 1963, Ser. No. 334,158
5 Claims. (Cl. 320—2)

This invention relates to a battery dispenser and charger device. There are many applications, for instance, hearing aids, which operate with an extremely small battery cell which has to be replaced by the user after a few hours' use. To meet this problem the hearing aid user is provided with battery dispenser containing several replacement cells so that after exhausting one cell he can replace it with another cell. Most of such hearing aids operate with what is known as dry or non-rechargeable cells, with the exhausted cell being discarded and replaced by a fresh cell.

The present invention involves a dispenser for supplying the user with similar small rechargeable battery cells, so that after the used rechargeable cell has been exhausted it may be replaced by fully-charged cell from the dispenser, with the exhausted cell being returned to the dispenser for recharging.

In accordance with the invention, such battery dispenser-charger has a cell holder or housing for holding a plurality of at least two rechargeable battery cells arrayed in a predetermined cell sequence and connected in series relation between two opposite polarity charging terminals of the dispenser so that the dispenser may be readily placed in and connected to a recharging device for recharging its serially connected cells. The cell holder or housing has wall opening means arranged so as to permit removal or withdrawal of the cell which has been held and recharged for the longest period in the cell recharging dispenser and the insertion of the exhausted cell in the dispenser behind the sequence of previously inserted cells so that it is automatically connected as the last cell for recharging it in series with the previously returned cells. Furthermore, the so last-returned cell is so held in the dispenser as to permit removal thereof only after removal of all cells which have been previously returned to the dispenser and subjected to more recharging than the last returned cell.

The foregoing and other objects of the invention will best be understood by the following description of exemplifications thereof, reference being had to the accompanying drawings wherein, FIG. 1 is a diagrammatic view and partially a vertical cross-section of battery cell dispenser-charger of the invention and of its associated cell-charging circuit device;

FIG. 2 is a vertical cross-sectional view of one form of a cell dispenser-charger of the invention as it is held in the charging device;

FIG. 3 is a top view of the dispenser-charger unit of FIG. 2;

FIGURE 3A is an end view of the bottom end of the dispenser housing as seen in FIGURE 2 with its four locking lug projections;

FIGURE 3B is a top view of the metallic bottom terminal of the dispenser of FIGURE 2 as seen from the top side thereof in FIGURE 2 with its four locking teeth;

FIG. 4 is a diagrammatic view of another form of battery cell dispenser-charger of the invention and of its associated charging circuit device;

FIG. 5 is a side elevation of a dispenser-charger unit of the type shown in FIGS. 4–9 as it is held in its charging device;

FIGURE 6 is a cross-sectional view of the charger of FIGURES 4 to 7 along two 90° inclined radial-plane lines 6—6 of FIGURE 7;

FIG. 7 is a top view of the dispenser-charger unit of FIGS. 4 and 5 with portions of one side wall removed to expose its underlying interior;

FIG. 8 is a cross-sectional view of a portion of same dispenser unit along lines 8—8 of FIG. 7; and FIG. 9 is a cross-sectional view similar to FIG. 8 with a returned cell partially advanced toward its first recharging position in the dispenser of FIGS. 4 to 8.

Although the battery cell dispenser-chargers of the invention disclosed herein are applicable for dispensing rechargeable battery cells for use in many other applications, examples thereof will herein be described in the form designed for dispensing charged flat miniature rechargeable cells of the type used in hearing aids. Such rechargeable cells may be made with the same dimensions as corresponding dry cells now generally used in hearing aids. Among examples of such miniature-size battery cells are the following:

Type 312, having a diameter of 5⁄16″ and a height of 0.135″;

Type 575, having a diameter of 0.450″ and a height of 0.135″;

Type 675, having a diameter of 0.450″ and a height of 0.200″; and

Type M401 having a diameter of 0.460″ and a height of 1.12″.

Examples of the present invention will be herein described in connection with such flat rechargeable cell having a diameter of 0.450″ and a height of 0.200″. Referring to the dispenser-charger 10 of the invention shown in FIGS. 1 to 3, there is held in its interior cell space a cell sequence consisting of four rechargeable cells 11, shown arrayed one above each other in a column within a tubular holder or housing body 20 of the dispenser.

Each rechargeable battery cell 11 comprises at least one negative electrode plate 12 and one opposite-polarity positive electrode plate 13, held separated by porous insulating separator (not shown) holding therein electrolyte for providing electro-chemical reactions between the two electrodes when discharging or charging the cell 11. As in conventional similar other sealed battery cells, the assembly of electrodes 12, 13 with their seperators and electrolyte are enclosed in a metallic casing shown comprising a tubular or cup shaped metallic casing 14, the upper end of which is enclosed by metallic casing cover 15.

As in the conventional similar sealed cells, the upper open edge region of tubular or cylindrical casing 14 is joined through the surrounding circular rim of metallic casing cover 15 across an insulating cover by a tight junction seal, for instance, by casing 14 over the rim of the metallic casing cover 15 and the insulating collar overlapping the rim of the casing cover, for instance, as described. Such insulating junction seals are described, for example, in U.S. Patent No. 3,081,366, issued March 12, 1963, and no further explanation is needed here.

For the sake of simplicity, the upper part of the dispenser housing 20 and of the battery cells 11 held therein, as seen in FIGS. 1 and 2, are herein designated in the specification and claims as the "upper part" thereof and their opposite ends are herein designated as the "downward part" thereof.

As conventional, the negative electrode 12 is shown metallically connected to the tubular metallic casing 14 and the positive electrode 13 is metallically connected to metallic casing cover 15. The two casing members 14, 15 constitute the exposed opposite-polarity terminals of each cell 11. With four similar or alike cells 11 assembled above each other in a column within dispenser housing 20 (FIGS. 1 and 2) the bottom casing wall of the upper three cell casings 14 is engaged and in contact with the upper casing wall 15 of the underlying cell 11. Such sequence of cells 11 held arrayed in the dispenser housing 20 automatically connects them in series with each other. The upper casing wall 15 of the upper cell 11 and the flat bottom casing wall 14 of the bottom cell of FIGS. 1 and 2 thus constitute the opposite polarity terminals of the sequence of four serially connected battery cells 11 held arranged in dispenser housing 20.

In the form shown in FIGS. 1 to 3, the cell dispenser or holder 10 holds the cells 11 in a tubular or cylindrical housing 20 of insulating material, such as nylon or other synthetic resin. To the bottom end of the tubular housing 20 is affixed metallic end wall 21, which may be done, for instance, by crimping its tubular rim 22 and forcing its edge region into the exterior layer of the tubular housing 20.

However, in accordance with the invention, an exhausted cell is inserted at the last charging location within the housing 20 through the open bottom end of housing 20. To this end the bottom casing wall 21 is detachably secured to the bottom end of tubular housing 20 as by threaded engagement of bottom-wall rim 22 with a threaded surrounded portion of housing 20. In the form shown (FIGS. 2, 3B), the bottom-wall rim 21 has at its upward end four peripherally displaced locking teeth 22–2, shaped for interlocking engagement with four peripherally displaced locking lugs 20–4 on the surrounded housing portion of housing 20 (FIGS. 2, 3A). The detachable bottom wall 21 and connection between the surrounded housing portion is similar to that commonly used in detachable connection between the metal caps of jars, such as used for dispensing marmalades and the like.

To the upper end of cylindrical insulating dispenser housing 20 is similarly secured the downwardly projecting rim 25–1 of an upper metallic casing end wall 25 being shown in the plan top view thereof in FIG. 3. This upper metallic housing end wall 25 is provided with a relatively wide open slot 26 exposing part of the top side casing wall 15 of cell 11 (FIGS. 1–3). The slot 26 in the upper metallic end wall 25 of the dispenser housing 20 is of a limited thickness so that the user may grip the rounded edge of the upper casing wall 15 of the top cell 11 exposed therethrough and push the upper cell 11 rightward as seen in FIG. 3 for removing it from the column sequence of battery cells 11 held in dispenser housing 20. To this end, the upper end of tubular cell housing 20 is provided at its right side, as seen in FIGS. 1, 2 and 3, with an opening 27 of sufficient width and height to enable removal of the top cell 11 from the interior of tubular housing 20 by gripping with the fingers the exposed rounded left edge of the top cell casing wall 15 and pushing it rightward through opening 27 of tubular dispensing housing 20. As soon as the upper cell 11 is so removed from the housing 20, the remaining three cells 11 of the cell sequence column are moved upwardly against the top metallic casing wall 25 by suitably biasing means 30 provided in the bottom or downward portion in the interior of dispenser housing 20. Although the biasing means 30 may be formed by a compressed body of elastic elastomer material, such as rubber, it is shown as consisting of a metallic biasing sheet member 31 biased to move in an upward direction and push the lowest cell 11 of the cell column held in dispenser housing 20 toward its metallic top end wall 25. As an example only, the metallic bias member 31 is held biased by a spirally metallic spring 34 having its opposite spring end turns seated against the interior surface of metallic end wall 21 and against the facing surface of upwardly biased metal sheet member 31 of the biasing means 30.

The rechargeable cell dispenser 10 of the invention is so arranged that after removing for the sequence of rechargeable cells 11 held therein for the longest recharging period, another exhausted cell 11 may be readily inserted therein, housing entrance means opening to take the last position of the sequence of cells previously inserted therein in sequence, one cell 11 after another cell 11, so that the last inserted cell 11 remains therein for the longest recharging period.

In the form of cell dispenser-charger 10 shown in FIGS. 1–3, the opening means—for inserting an exhausted cell 11 at the end of the cell sequence previously inserted therein—consists of an entrance opening 37 in the side wall of housing 20 lying opposite the position of the last cell 11 of the sequence of cells that can be housed or held therein for successive advancement to the exit opening 27 for recharging it before it is advanced step by step to the exit opening 27 through which it is removed only after all previously returned cells 11 have been removed.

In the example the dispenser-charger of the invention shown at 10 in FIGS. 1–3, the cell insert opening 37 has the same width and height as the cell exit or removal opening 27 described above. This cell-insert opening 37 is located in the wall portion of dispenser housing lying opposite the last cell 11 of the full complement of cells 11 that can be inserted into the housing 20. In the example of FIGS. 1–3 four cells 11 constitute the full complement of cells 11 that can be held serially connected between the opposite recharging terminals 21 and 25 of dispenser-charger 10.

With a full complement or sequence of rechargeable battery cells 11 such as the four cells 11 held biased to move in upward direction within example of dispenser housing 20 (FIGS. 1–3), removal of the top cell 11 through dispenser exit opening 27 causes the biasing means 30 to move its bias member 31 in upward direction and advance by one stop the remaining three cells 11 of the cell sequence in upward direction, so that the bottom casing wall of the last of the remaining sequence of three cells 11 is held in proper sequence above the upper level of insert or entrance opening 37 of the dispenser housing 20. The cell biasing wall 31 of the biasing means 30 is so shaped as to be guided by the cylindrical interior side wall surfaces of the surrounding dispenser housing 20 for movement in an upward direction along the axis of cylindrical housing 20.

As an example, the periphery of metallic biasing wall 31 engaging and biasing upwardly the column of remaining three cells 11 is given spherical shape which is adjoined at the downward end by a cylindrical wall section fitting and guided for parallel up and down movement by the surrounding cylindrical dispenser housing walls 20. The exterior surface of biasing wall 31 facing cell insert opening 37 of housing 20 is so shaped that when an exhausted cell is pushed through insert opening 37 to the left into the housing interior, the rounded bottom wall casing edge of the inwardly pushed exhausted cell 11–1 will push the engaged upwardly tapering surface of the biasing wall 31 in downward direction as the inserted exhausted cell 11 moves inwardly and assumes the last sequence position of the column of four cells 11 which are shown held for recharging and for successive withdrawal from the sequence of cells 11 through exit opening 27 of dispenser housing 20, as explained above.

The metallic cell biasing wall 31 has good metallic connection to bottom terminal walls 21 as by the metallic spring 34 having a good metallic connection to biasing wall 31 and bottom terminal wall 21. Furthermore, a flexible metallic conductor (not shown) may have its ends metallically connected to metallic biasing wall 31.

In the particular form of the invention, shown in FIGS. 2 and 3A, 3B, having the detachable end wall 21, bottom entrance opening of housing 20 is used for inserting an exhausted cell in the last charging location nearest the bottom end wall 21 of housing 20. With the arrangement in FIGS. 1, 2, 3A, to insert an exhausted cell into the dispenser after fully-charged cell has been removed through the upper removal opening 27 of housing 20, metallic bottom terminal end wall 21 is angularly turned from its locked position to release its locking teeth 22–2 from engagement with the housing locking lugs 20–5 and removed from the bottom end of the housing 20 as seen in FIG. 2 (while held vertically reversed relative to the position shown in FIG. 2). With the bottom end of housing 20 now open, an exhausted cell 11 is positioned at the bottom end of the column of cells 11 previously inserted into the dispenser housing 20 for recharging. Thereupon the bottom endwall 21 is again affixed to the open housing end (as seen in FIG. 2). When so affixed the biasing spring 34 of terminal end wall engages with its biasing wall 31, the bottom casing wall of the last exhausted cell 11 placed at the end of the column of cells previously returned to their charging locations within dispenser housing 20, for advancing the cells to the next further charging locations in housing 20 when a fully charged cell 11 is removed through removal opening 27.

In dispenser-charger arrangement of the invention of the type described above the upward biasing pressure of the biasing means 30 maintains the flat upper surface of upper casing wall 15 of upper or first cell 11 of the sequence of cells biased against the overlying metallic portions 26–1 of the upper metallic end wall 25 of housing 20. With this arrangement all rechargeable battery cells 11 of the sequence of cells held in the cylindrical interior housing 20 will be connected in series between the bottom and top metallic terminal end walls 21 and 25 of dispenser housing 20. This makes it possible to insert the dispenser unit 10 into a charging compartment 41 of charger 40 having two charging terminals 43, 44 through which the serially connected sequence of cells 11 are connected in series with a battery charging circuit 45 shown diagrammatically in FIG. 1.

FIG. 1 shows charger unit 40 having two opposite charging terminals 43, 44 exposed at the opposite ends of a charger compartment 41 so that they come in contact engagement with the opposite terminal end walls 21, 25 of dispenser-charge unit 20 when it is inserted into the charging compartment 41 through its entrance opening at the left side thereof. In the arrangement shown in FIG. 2, the charging unit 40 has its charging compartment 41 provided with an entrance opening facing the viewer so that when the dispenser 10 is inserted into the charging compartment 41 the opposite dispenser end terminals 21, 25 will automatically establish contact engagements with the exposed opposite charging terminals 43, 44 of charging compartment 41.

In accordance with the invention, the dispenser-charger unit 10 is provided with polarizing means arranged for assuring that it can be placed into contact engagement with the opposite polarity charging terminals 43, 44 of the charging unit 40 only in one polarized condition or position for assuring that charging current from the charging circuit 45 will flow through the serially connected battery cells 11 of dispenser unit 10 in the proper charging direction only.

In the forms shown in FIGS. 1 and 2 the metallic terminal wall 21 has a downward metallic polarizing projection 21–2 shaped to enter a polarizing channel 41–1 formed in the facing bottom wall of charger compartment 41 while the opposite compartment wall without such polarizing channel prevents entry of dispenser 10 into the charging compartment 41, unless it is inserted in its proper polarized position.

FIG. 1 shows diagrammatically a conventional form of a cell charger circuit 65 suitable for charging a plurality of serially connected rechargeable cells 11 held in proper sequence in a dispenser-charger 10 of the invention. Charger circuit 65 comprises alternating current supply leads 71 extending from a conventional plug 72 adapted to be plugged into a domestic power supply circuit, for instance, of 110 or 120 volts. A stepdown transformer 73 has primary windings connected to the power supply leads 71 and secondary windings with a mid tap connected through a lead 74 to a charging terminal 43 of charger unit 40.

The two ends of secondary transformer windings are connected through rectifiers 75 to rectify opposite half waves of alternating current into unidirectional current flowing in proper charging direction through lead 74 to opposite charging terminal 44 of charger 40.

Charging lead 54 has included therein a resistance 54' proportioned to assure that proper level of charging current is supplied to the serially connected sequence of cells 11 held in the dispenser-charger 10.

A dispenser-charger 10 of the invention enables the user to retain a reserve of a plurality of rechargeable cells held in proper charging sequence to assure that a fully charged cell can be readily withdrawn therefrom for replacing an exhausted cell from an appliance, such as a hearing aid worn by the user. The dispenser 10 is of a very small size and can be conveniently carried in the pocket of the user. The user has thus available in reserve a sequence of several cells, at least one or two of which are fully charged and are ready for replacement in his appliance, such as a hearing aid, when the cell in use has been exhausted. The user merely removes the exhausted cell from his hearing aid, whereupon he removes from the dispenser the highest cell of the cell sequence, which remained for the longest recharging period. Following removal of the highest sequence cell 11 he returns the exhausted cell to the dispenser, which he can place therein only as the last of the sequence of cells held in the dispenser for recharging.

When the user returns home, or, in travelling, reaches a place having a source of charging power, he may readily connect the charger to the power supply and leave the dispenser in the charger for recharging the exhausted cells during the night, for instance.

The principles of the invention will suggest to those skilled in the art various other modifications thereof. As an example, there will now be described another type of dispenser-charger, although based on the basic principles of invention disclosed herein, embodying distinct features of invention claimed in co-pending application Serial No. 334,162 filed December 30, 1963, by Robert J. McCarthy.

In accordance with the invention hereinafter disclosed a battery cell dispenser-charger has cell advancing means operative to advance in one direction only a sequence of at least two rechargeable cells a sequence of successive charging positions with all cells in all of said sequence positions being held serially connected between dispenser charging terminals for charging all cells held in sequence in each such charging position. In addition, the dispenser requires only one passage opening through which the recharged cell that was the first inserted into its cell sequence may be removed from the dispenser and through which an exhausted cell may be inserted therein as the last cell of the cell sequence.

FIG. 4 shows diagrammatically, and FIGS. 5–9 show structurally, one example of a dispenser-charger device based on the just described principles of the invention. It comprises a dispenser 10–5 shown as a flat structure of small height or thickness, as indicated in FIG. 5. The dispenser 10–5 has two side walls 20–5 and 30–5 shown bounded by flat outer wall surfaces which may, however, be of other shape. In exterior wall portions of dispenser 10–5 are held affixed two external exposed charging terminals 25–8, 25–9 arranged so that when the dispenser 10–5 is inserted into discharging compartment space 61 of charger 60 (FIG. 5) the two dispenser charging terminals 25–8, 25–9 will automatically establish contact engagement with charging circuit terminals 63, 64 of charging circuit means 65, forming part of the charger 60 (FIG. 4).

Dispenser 10–5 has two dispenser side walls 20–5, 30–5 defining between them a cell space within which are held in predetermined charging sequence a plurality of rechargeable battery cells 11, such as described hereinbefore.

The cell space of dispenser 10–5 is provided with cell advancing means or member 40 moveably positioned between the side walls 20–5, 30–5 of the dispenser 10–5. In the form shown, cell advancing member 40 has a central bearing rotatably seated on a shaft projection 23–5 of side wall 20–5, although it may be formed by a similar projection of the other side wall 10–5 or by a shaft joining the two side walls 20–5, 30–5. Suitable means, a rivet 29–5, for example, are provided for holding two side walls 20–5, 30–5 affixed to each other so as to hold therebetween for rotatable advancing motion the cell advancing member 40. Although it may have a larger number of cell holding spaces, depending on the particular use, the dispenser 10–5 shown has a cell advancing member 40 provided with four cell holding positions or spaces 42 for holding a sequence of three cells 11 in serially connected charging positions with the fourth similar cell space 42 used for removing the cell which was first placed in its charging cell sequence, or adding an exhausted cell as the last cell of the sequence of cells to be charged. In the specific example of dispenser shown, the cell holding spaces 42 are designed to hold the rechargeable cells 11 in flatwise positions. However, the dispenser shown can be readily modified so that the individual cells may be held therein in a 90° turned position with the flat cell casing bottom wall extending perpendicularly to the facing inner wall surface 22–5 of side wall 20–5.

One of the dispenser side walls 20–5, 30–5, for example, side wall 30–5, is provided with a passage opening 30–6 through which the first of the sequence of three cells 11 held in three charging positions of the dispenser 10–5 is removed from the charging sequence. The same wall passage opening 30–6 also serves to insert an exhausted cell 11 into the dispenser 10–5 as the last of the sequence of three cells 11 held in the three charging positions of the dispenser. In the form shown, dispenser side wall 30–5, seen in the plan view of FIG. 7, is provided with the cell passage opening 30–6 exposing therein the upper casing wall 15 of the battery cell 11 as it is held in the underlying cell space 42 of the cell advancing member 40, and also as seen in the dispenser cross-section of FIGS. 8 and 9. FIGURE 7 shows the major part of the cell dispenser with the dispenser wall 30–5 broken away, to expose the major part of the cell advancing member 40 holding in three of its cell spaces 42 three battery cells 11 with the positive cell casing terminal 15 facing upwardly (FIG. 7) and the oppositely facing flat bottom wall of each cell casing resting on the interior surface 22–5 of the downward casing side wall 20–5.

The dispenser housing 10–5 formed by its side walls 20–5, 30–5 is also provided with electric conductor members for automatically connecting all three cells 11 held by advancing member 40 in the three charging positions in series connection between two charging terminals 28–5 and 25–9 of the dispenser 10–5.

As an example, two opposite-polarity metallic charging terminals 25–8, 25–9 may be affixed on two opposite exposed wall portions on the periphery of the two side wall members 20–5, 30–5 of dispenser housing 10–5 (FIGS. 4 and 5). The two charging terminals 25–8, 25–9 are so arranged that when the dispenser 10–5 is inserted into a charging space 61 of a charger 60 (FIG. 5) they will be automatically connected with the charging terminals 63, 64 of the charging circuit 65 thereof (FIGS. 4 and 5).

The dispenser 10–5 has also metallic connectors 46 for connecting all cells 11 held in its several charging positions in series relation between the charging terminals 25–8, 25–9 thereof, as the cells 11 are advanced step-by-step to the successive charging positions by the step-wise motion of cell advancing member 40. The example of dispenser shown has only three charging positions. In FIGS. 4 and 7 the three charging positions to which each cell 11 is successively advanced are indicated by three arrows 11–1, 11–2 and 11–3. The series connectors 46–5 for serially connecting the sequence of cells 11 which are advanced to the dispenser charging positions 11–1, 11–2, 11–3 may be formed by printed circuit portions or a combination of printed and solid conductors portions or by independent solid conductors.

FIGS. 6 and 7 show the dispenser 10 provided with spring conductors 46–5 of Phosphor bronze sheet metal, for example, for serially connecting the three cells 11 held in or advanced to the three charging positions 11–1, 11–2, 11–3 between the dispenser charging terminals 25–8, 25–9. One spring connector 46 connects the positive terminal 15 of the cell in charging position 11–1 to the opposite polarity cell bottom terminal of the cell casing 14 held in charging position 11–2. The other spring connector 46 similarly connects the positive casing terminal 15 of the cell held in charging position 11–2 to the negative bottom casing terminal 14 of the cell held in charging position 11–3. Each spring connector 46 has a bottom arm (as seen in FIG. 4) engaging the bottom casing terminal 14 of one cell and a curved upper end arm 46 engaging the positive casing end terminal 15 of the next cell. Each series connector 46 is indicated as formed of two connector sections having their respective ends bent into anchor elements metallically engaging each other and held affixed or anchored in a slit of central side wall projection 23–5 (FIG. 6). To complete the series connections of the sequence of cells 11 held in the several charged positions to the charging circuit, the bottom casing terminal 14 of the cell in the position 11–3 is connected through a conductor 25–6 of the housing wall structure to the exposed dispenser charging terminal 25–8. The opposite dispenser charging terminal 25–9 is connected through a similar conductor 25–7 to the positive terminal 15 of the cell held in charging position 11–1. In each of the different charging positions 11–1, 11–2, 11–3 of the dispenser the end portions of the two connector conductors 46 which engage opposite polarity metallic walls of two successive charged cells 11 are provided with conventional biasing means to assure positive contact engagement with the respective cell casing terminal walls. As an example, contacting ends of the connector conductors 46 may be of spring metal biased into pressure contact engagement with adjacent metallic casing wall of the cell 11 thus causing the opposite cell terminal wall to engage with a corresponding pressure contact in engagement with its associated opposite flat connector end.

The dispenser of the invention, exemplified in FIGS. 4 to 9, is provided with means for assuring that the individual cells 11 of the cell sequence thereof are advanced to successive charging positions, such as charging positions 11–1, 11–2, 11–3, in one direction only.

As seen in FIGS. 6 and 7, one of the dispenser side walls has a recessed border portion 38 for exposing a peripheral portion 40–8 of cell advancing member 40 so that it may be gripped as by the hand of the user for advancing step-wise within the dispenser housing.

In the example of the dispenser shown in FIGS. 4 to 9, cell advancing member 40 is arranged to advance its sequence of cells 11 to the successive charging positions 11–1, 11–2, 11–3, etc. by counterclockwise motion as indicated by arrow 40–9 (FIG. 4). With such cell advancing arrangement the cell occupying cell position 11–3 has reached it after having been advanced by cell advancing means 40 past charging positions 11–1 and 11–2, in each of which the cell has been subjected to recharging.

Assuming that the rechargeable cell 11 of the user's appliance, such as a hearing aid, has become exhausted and he desires to replace it with a recharged battery cell 11 from the dispenser 10–5. In such case he inserts the exhausted cell 11 through the dispenser wall passage 30–6 into the underlying cell space 42 of cell advancing member 40, as seen at dispenser passage opening 36–6 in FIG. 8. He thereupon grips exposed rim portion 40-8 of advancing member 40 and advances it one step, which brings the exhausted cell previously inserted through wall passage 30-6 to first charging position 11-1 of dispenser. In this advancing step, cell advancing member 40 also brings the recharged cell 11 from the last dispenser charging position 11-3 to wall passage opening 30-6 from which the user removes it and inserts it as a replacement in his appliance. In other words, the user turns exposed rim 40-8 of the cell advancing member 40 exposed along a recessed side wall portion 30-8 (FIGS. 6, 7) until the cell which occupied charging position 11-3 has been brought, by counterclockwise motion, to cell passage opening 30-6 of dispenser wall 30-5 as the counterclockwise movement of the cell advancing member 40 brings the exhausted cell—previously placed through wall passage 30-6 into cell advancing member 40—to the first charging position 11-1.

The dispenser of the invention is also provided with means for assuring that cell advancing member 40 can be advanced in only one direction, and only by successive steps from one charging position to the next charging position within the dispenser.

FIGS. 8 and 9 show one arrangement of means for assuring that cell advancing member 40 may be advanced in the dispenser in one direction only to bring each cell held therein to successive charging positions and also assuring that such advancing motion shall be performed step by step to bring an exhausted cell 11 from the wall passage position 30-6 to the first charging position 11-1, as the previously inserted cells 11 are advanced to the next charging positions 11-2, 11-3, and the recharged cell from position 11-3 is returned to the wall passage 30-6 from which the user removes it as replacement for the exhausted cell 11.

FIG. 8 being a cross-section of the dispenser 10-5 along lines 8—8 of FIG. 7 shows a portion of side wall 30-5 having the opening 30-6 through which an exhausted cell 11 is placed in the underlying cell space 42 of the cell advancing member 40. The underlying portion of the opposite dispenser wall 20-5 has a compartment or recess 51 holding therein a ratchet wall portion 52 with a ratchet projection 53 biased by suitable bias means in upward direction as seen in FIG. 8 into the cell space 42 of cell advancing member 40.

Any suitable biasing means may be used for biasing ratchet wall portion 51-6 in an upward direction as seen in FIG. 8. As an example, ratchet wall 51-6 may be formed of a synthetic resin material, as are all the other wall members 20, 30, 40 of the dispenser 10-5. The upper ratchet wall member 52 may be molded as part of sidewall 20-5 so that its thinner wall portion is biased by its elastic restoring forces to forcefully raise its ratchet projection 53 from sidewall compartment 51-5 into overlying cell space 42 of advancing member 40. The connection of the thinner portion of the ratchet wall 52 to adjacent wall body 20-5 is made flexible and of such thickness so that the elastic restoring forces thereof maintain the thicker part of ratchet wall body 52 biased in upward direction so that its ratchet projection 53 is held within the cell space 42 of cell advancing member 40. For simplifying the description of ratchet wall member 52 is shown biased for upward movement by a compressed helical coil spring 51-8. Upward movement of the ratchet wall 52 may be limited, for instance, by forming it with lateral projections wider than the width of the overlying cell space 42 of advancing member 40. With such ratchet wall arrangement cell advancing member 40 may be advanced within the housing only in the counterclockwise arrow direction to the left, as indicated by arrow 40-9 (FIGS. 4, 7, 8 and 9). The upwardly biased ratchet projection 53 prevents opposite clockwise motion of cell advancing member 40 within the dispenser 10-5.

The upwardly biased ratchet wall 52 may be readily proportioned and designed so as to automatically eject a fully recharged cell 11 advanced from dispenser charging position 11-3 to dispenser wall passage 30-6 position. Such an arrangement assures that a fully charged cell 11 will be automatically lifted from its position within the cell advancing member 40 into the wall passage opening 30-6. By providing the ejector wall portion 51-6 with the required selected biasing means 51-8 such recharged cell, when brought opposite to dispenser wall passage 30-6, will be automatically ejected from its position within the dispenser.

It is also extremely simple to bring into the first charging position 11-1 an exhausted cell after inserting it through wall passage 30-6 into underlying cell advancing space 42. To this end the user places the exhausted cell through the wall passage 30-6 into the underlying cell space 42 of advancing member 40 (FIGS. 4 and 5). Thereupon the so positioned cell 11 is pushed inwardly against the ratchet wall 52 until the latter is stopped by engagement with one or more wall stops 52-5 in compartment 51 of dispenser wall 20-5. With the cell 11 now aligned in height with the surrounding body of the cell advancing member 40, the exposed rim 40-8 of cell advancing member 40 is gripped and advanced until the ratchet wall 52 reaches the next cell space 42 of cell advancing member 40, whereupon its ratchet projection 53 immediately enters this cell advancing member space 42 and retains it in this position.

The charging device 60 (FIGS. 5 and 6) has a charging circuit for supplying direct-current charge to the serially connected cells 11 of dispenser 10-5 placed with polarized orientation in charger space 61 of charger 60. As an example, the charger 60 (FIG. 4) may have a charging circuit 65 similar to that described in connection with FIG. 1.

The principles underlying the invention described in connection with specific exemplifications will suggest other modifications thereof. It is accordingly desired that the appended claims shall not be limited to specific features shown or described herein.

The embodiments of the invention in which an exclusive privilege or property is claimed are defined as follows:

1. In a battery dispenser-charger device,
a holder tube defining a tubular space having a sequence of at least three cell locations for charging in a sequence a sequence of at least three cells and including a first charge location for holding the first cell and a last charge location for holding the last cell of a cell sequence in successive charging locations of said location sequence,
resilient advancing means for advancing the cells held in said charging sequence to successive charging locations in the direction toward said last charging location,
said tube having two charging terminals at the opposite ends of said tube whereby said advancing means holds a column of cells next to each other in series relation between said charging terminals for supplying series charging current from an external circuit,
said tube having one opening adjacent on charging terminal for removing a cell from said last charging location,
said tubular holder having an open tube end remote of said one charging terminal for inserting a cell into said first charging location,
the opposite charging terminal having a detachable connection to said opposite tube end for retaining the sequence of cells in said cell locations, after inserting a cell into said first charging location,
said opposite charging terminal carrying said resilient advancing means,
said advancing means including connector means for completing a charging connection from said opposite charging terminal to the nearest cell held in said tube.

2. In a battery dispenser-charger device:
a holder having a substantially enclosed housing,
said housing of a size to be conveniently carried on the person of the user,
and hand-held during the removal or insertion of batteries,
said holder defining internally located, combined storage and charging spaces, having a sequence of at least three battery cell locations, for charging in sequence at least three battery cells,
said combined storage and charging spaces including a first charging location for holding the first battery cell and a last charging location for the last battery cell of the battery cell sequence held in successive charging locations of said location sequence,
resilient advancing means internal of said housing for advancing the battery cells held in said charging sequence to successive charging locations in the direction from said first charging location toward such last charging location, whereat said battery cells may be charged while being stored internal of said housing,
said holder containing charging terminals external of said housing and connector means internal of said housing for serially connecting all battery cells held in said internal charging locations in series with said external charging terminals,
said external charging terminals adapted to permit connection of said holder with its internally located and stored battery cells, as a self-contained integral unit, to an external charging circuit,
said holder having opening means for removing a charged battery cell from said last charging location and for inserting a discharged battery cell into said first charging location.

3. In a battery dispenser-charger device as claimed in claim 2,
said two external charging terminals being exposed to engagement with complementary external terminals of a charging structure having a shaped complementary space for holding said device in a charging condition and recharging said device,
the exterior of one of said charging terminals having a structural polarizing element distinguishing said one from the other charging terminal,
for confining the engagement of said charging with said external terminals to one condition only.

4. In a battery dispenser-charger device, as set forth in claim 2:
said housing having an internal tubular volume, with said combined storage and charging spaces being successively located along the length of said volume,
said battery cells being located in end-to-end columnar relationship, with said first charging location being at one end of said tubular volume, and said last charging location being at the opposite end of said tubular volume.

5. In a battery dispenser as set forth in claim 4:
said resilient advancing means including a displaceable member for urging said column of cells towards said opposite end of the tubular volume,
said opening means including an open tube end opposite said one charging terminal for inserting a cell into said first charging location,
the opposite charging terminal having a detachable connection to said opposite tube end for retaining the sequence of cells in said cell locations, after inserting a cell into said first charging location.

References Cited by the Examiner

UNITED STATES PATENTS

| 1,832,948 | 11/1931 | Schmidt | 324—29.5 |
| 3,116,451 | 11/1963 | Hatterschide | 324—29.5 |
| 3,143,697 | 8/1964 | Springer | 320—2 |
| 3,180,521 | 4/1965 | Di Domenico et al. | 324—29.5 X |

FOREIGN PATENTS 203,873  10/1956  Australia.

JOHN F. COUCH, *Primary Examiner.*

S. WEINBERG, *Assistant Examiner.*